(12) United States Patent
Rowan (10) Patent No.: US 8,355,872 B2
(45) Date of Patent: Jan. 15, 2013

(54) SYSTEM AND METHOD FOR RESERVOIR ANALYSIS BACKGROUND

(75) Inventor: Dana E. Rowan, Kingwood, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 379 days.

(21) Appl. No.: 12/621,704

(22) Filed: Nov. 19, 2009

(65) Prior Publication Data
US 2011/0118983 A1    May 19, 2011

(51) Int. Cl.
*G01V 9/00* (2006.01)
(52) U.S. Cl. ............ 702/6; 702/7; 702/14; 367/72; 367/73; 367/70; 703/10
(58) Field of Classification Search ............ 702/7, 14, 702/56, 12, 6, 11, 179; 367/72, 73, 53, 59, 367/62, 70, 38; 73/152.14; 166/369, 250.15, 166/293, 264, 254.1, 250.1, 54.1, 250.17; 703/10, 2
See application file for complete search history.

(56) References Cited

U.S. PATENT DOCUMENTS

| | | | | |
|---|---|---|---|---|
| 4,210,964 | A | * | 7/1980 | Rogers et al. .................... 703/10 |
| 5,018,112 | A | * | 5/1991 | Pinkerton et al. ................ 367/72 |
| 5,453,958 | A | * | 9/1995 | Neff ................................. 367/70 |
| 5,586,082 | A | * | 12/1996 | Anderson et al. ............... 367/73 |
| 5,681,568 | A | * | 10/1997 | Goldin et al. ............... 424/184.1 |
| 5,835,882 | A | * | 11/1998 | Vienot et al. ....................... 702/7 |
| 5,966,672 | A | * | 10/1999 | Knupp ............................. 702/16 |
| 6,138,075 | A | * | 10/2000 | Yost ................................. 702/14 |
| 6,236,942 | B1 | * | 5/2001 | Bush ............................... 702/14 |
| 6,302,221 | B1 | * | 10/2001 | Hamman et al. ................ 175/50 |
| 6,411,903 | B2 | * | 6/2002 | Bush ............................... 702/14 |
| 6,662,109 | B2 | * | 12/2003 | Roggero et al. .................. 702/6 |
| 6,662,146 | B1 | * | 12/2003 | Watts .............................. 703/10 |
| 6,718,265 | B2 | * | 4/2004 | Herron et al. ..................... 702/8 |
| 6,754,587 | B1 | * | 6/2004 | Trappe et al. ................... 702/10 |
| 6,907,392 | B2 | * | 6/2005 | Bennis et al. .................. 703/10 |
| 7,024,021 | B2 | * | 4/2006 | Dunn et al. ................... 382/109 |

(Continued)

OTHER PUBLICATIONS

J. Harff et al. Quantitative Assessment of Mineral Resources with an Application to Petroleum Geology. Natural Resources Research. 1992, vol. 1, No. 1 pp. 74-84.

*Primary Examiner* — Carol Tsai
(74) *Attorney, Agent, or Firm* — Carlos L. Hanze (57) ABSTRACT

A system for and method of automatically evaluating similarity between a target geological region of interest and a plurality of known geological regions of interest includes selecting a plurality of quantitative parameters describing reservoir characteristics of the target geological region of interest and defining a graphical target line based on values of the selected parameters. Comparison lines are graphically constructed for at least some of the plurality of known geological regions of interest, respective comparison lines representing respective values of the quantitative parameters describing corresponding characteristics of respective regions among the known geological regions of interest. A similarity factor between each of the comparison lines and the target line is calculated based on the plotted target and comparison lines. The comparison lines are ranked based on the calculated similarity factors, and similarity factor versus similarity rank are graphically displayed.

10 Claims, 6 Drawing Sheets

U.S. PATENT DOCUMENTS

| | | |
|---|---|---|
| 7,280,952 B2 * | 10/2007 | Butler et al. .................... 703/10 |
| 7,783,462 B2 * | 8/2010 | Landis, Jr. et al. .............. 703/10 |
| 7,844,430 B2 * | 11/2010 | Landis, Jr. et al. .............. 703/10 |
| 2004/0158406 A1 | 8/2004 | Harrison |
| 2004/0210547 A1 | 10/2004 | Wentland et al. |
| 2006/0154306 A1 * | 7/2006 | Kotlar et al. ................... 435/7.2 |
| 2006/0289157 A1 * | 12/2006 | Rao .............................. 166/268 |
| 2008/0040086 A1 | 2/2008 | Betancourt et al. |
| 2011/0054869 A1 * | 3/2011 | Li et al. ........................... 703/10 |
| 2012/0010865 A1 * | 1/2012 | Benson ........................... 703/10 |

* cited by examiner

SYSTEM AND METHOD FOR RESERVOIR ANALYSIS BACKGROUND

FIELD OF THE INVENTION

The present invention relates generally to characterization of hydrocarbon reservoirs and more particularly to characterizing a newly identified reservoir against known reservoir analogs.

BACKGROUND OF THE INVENTION

In evaluating the potential value of a newly identified reservoir or the potential value of capital projects within an existing developed reservoir, it may be useful to identify analogous reservoirs about which various value information is already known. In particular, such analogs may provide information regarding which production technologies should be applied, estimates of resource size and/or capture difficulty, and may reduce overall uncertainty about the reservoir. One approach to this problem has been to classify reservoirs into populations having similar characteristics. For example, a group may include all reservoirs having a particular range of permeability, or all water flooded reservoirs.

SUMMARY OF THE INVENTION

An aspect of an embodiment of the present invention includes a method of automatically evaluating similarity between a target geological region of interest and a plurality of known geological regions of interest, includes selecting a plurality of quantitative parameters describing reservoir characteristics of the target geological region of interest and defining a graphical target line based on values of the selected parameters. The method includes graphically constructing comparison lines, for at least some of the plurality of known geological regions of interest, and respective comparison lines representing respective values of the quantitative parameters describing corresponding characteristics of respective regions among the known geological regions of interest. Based on the plotted target and comparison lines, a similarity factor is calculated between each of the comparison lines and the target line. The comparison lines are ranked based on the calculated similarity factors, and similarity factor versus similarity rank is graphically displayed.

BRIEF DESCRIPTION OF THE DRAWINGS

Other features described herein will be more readily apparent to those skilled in the art when reading the following detailed description in connection with the accompanying drawings, wherein.

DETAILED DESCRIPTION OF THE INVENTION

Figure 1:
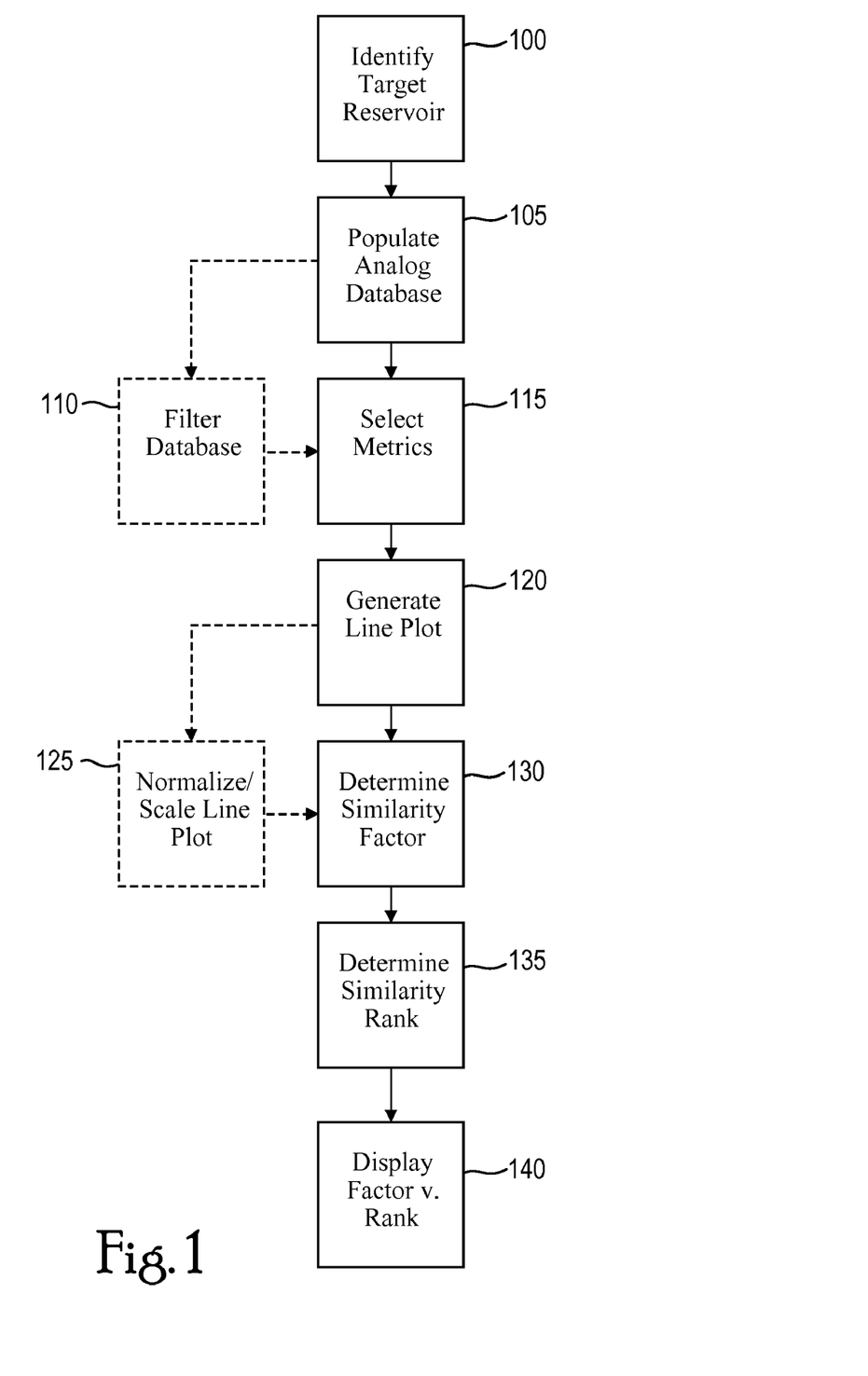
FIG. 1 is a flowchart illustrating steps in accordance with an embodiment of the present invention.

FIG. 1 is a flowchart illustrating a workflow in accordance with an embodiment of the present invention. At 100, a target reservoir of interest is identified. In general, the target reservoir will be a recently identified reservoir, or one that has not yet been exploited, however the method as described is capable of being applied to any reservoir for which some characteristics are known and a classification against known reservoirs is desirable. Next, a database is populated 105 with reservoir parameters that are to be used in determining analogs for the target reservoir. Data for this database may be, for example, commercially available databases such as IHS Energy Data Information Navigator (EDIN) database or data from C&C Reservoirs, or may come from other proprietary sources. As will be appreciated, the selected reservoir parameters used in populating the database should correspond to reservoir parameters available to characterize the target reservoir.

Optionally, the reservoir database may be filtered 110 into appropriate analog families. For example, a family may be defined based on reservoir lithology, displacement drive mechanism, depositional environment, depositional energy, basin type, geography, geologic age, and/or trap type. A user may select appropriate filters of these types so that reservoirs that are likely to be poor analogs are excluded from the analysis.

A group of specific metrics are selected 115 to be used in the calculation of similarity factor and similarity rank. Examples of useful metrics include net-to-gross ratio, viscosity, permeability, porosity, original pressure and the like. While one skilled in the art will appreciate that any quantitative characterizations may be used, it is also possible to employ qualitative characterizations of the reservoirs, including, but not limited to, reservoir geologic time period of deposition, drive mechanism, geologic basin name, and the like, as long as the qualitative characterizations may be expressed in a quantitative format.

Figure 2:
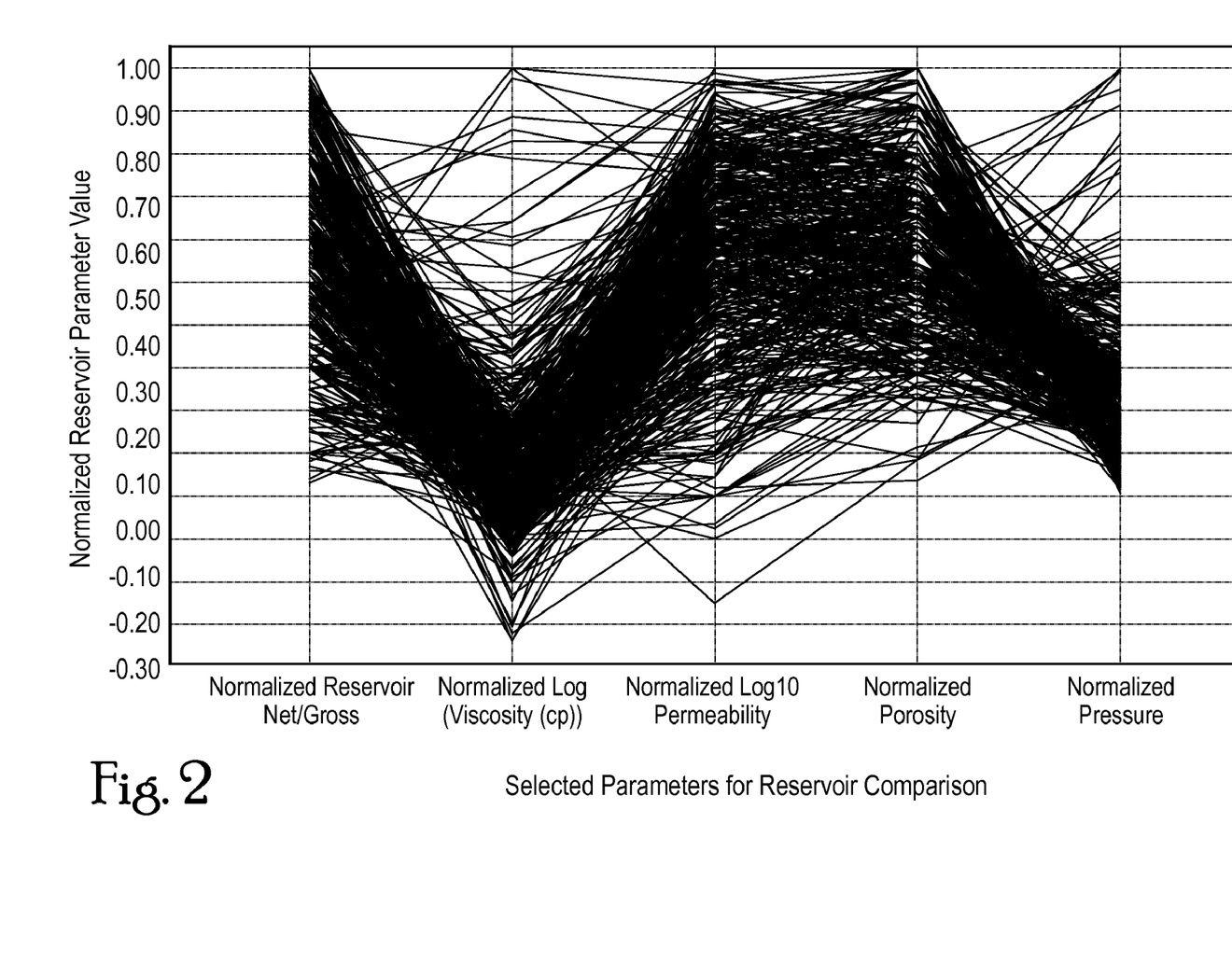
FIG. 2 is a line plot of selected reservoir metrics for comparison against a target reservoir in accordance with an embodiment of the present invention.

For the selected reservoir metrics, a line plot is generated 120 for each of the reservoirs in the reservoir database, or the filtered reservoir database if filtering is employed. A resulting line plot in accordance with an embodiment of the invention is illustrated in FIG. 2. In the figure, each line, which joins the plotted values of the selected metrics, represents one of the reservoirs in the reservoir database. Optionally, the values of the metrics may be normalized and scaled 125, in order to increase line differences, thereby increasing the effectiveness of the identification of analogs. In the example of FIG. 2, such normalization and scaling is illustrated.

In FIG. 2, the selected metrics are net to gross ratio, log of viscosity, permeability, porosity and original pressure. As will be appreciated, selection of other metrics may lead to different visualizations and therefore different results. One of ordinary skill in the art may select the metrics to be used based in part on the same considerations that are used in filtering the potential analog database. That is, where, for example, the database is filtered to select for reservoirs having a particular sandstone content, then metrics relevant to classifying sandstone reservoirs should be selected for the line plots.

Once the samples are plotted, a line similarity algorithm is applied 130 to a line representing values of the metrics for the target reservoir. As an example, Spotfire visualization software available from TIBCO Software of Palo Alto, Calif.

includes line similarity analysis functionality. Other commercial software packages and a variety of algorithms for line similarity analysis are available and could be applied in accordance with embodiments of the present invention. In general, such software may be implemented in a programmable general purpose computer, such as a Windows-based personal computer.

The line similarity algorithm produces a similarity factor for each line of the reservoirs in the reservoir database. The similarity factor may be between negative one and one, with one indicating an exact similarity and negative one indicating an inverse line similarity factor, while a zero value of similarity factor represents a lack of similarity. Once each line has a similarity factor assigned, the lines may be ranked from, e.g., highest to lowest, to produce 135 a similarity rank.

Figure 3:
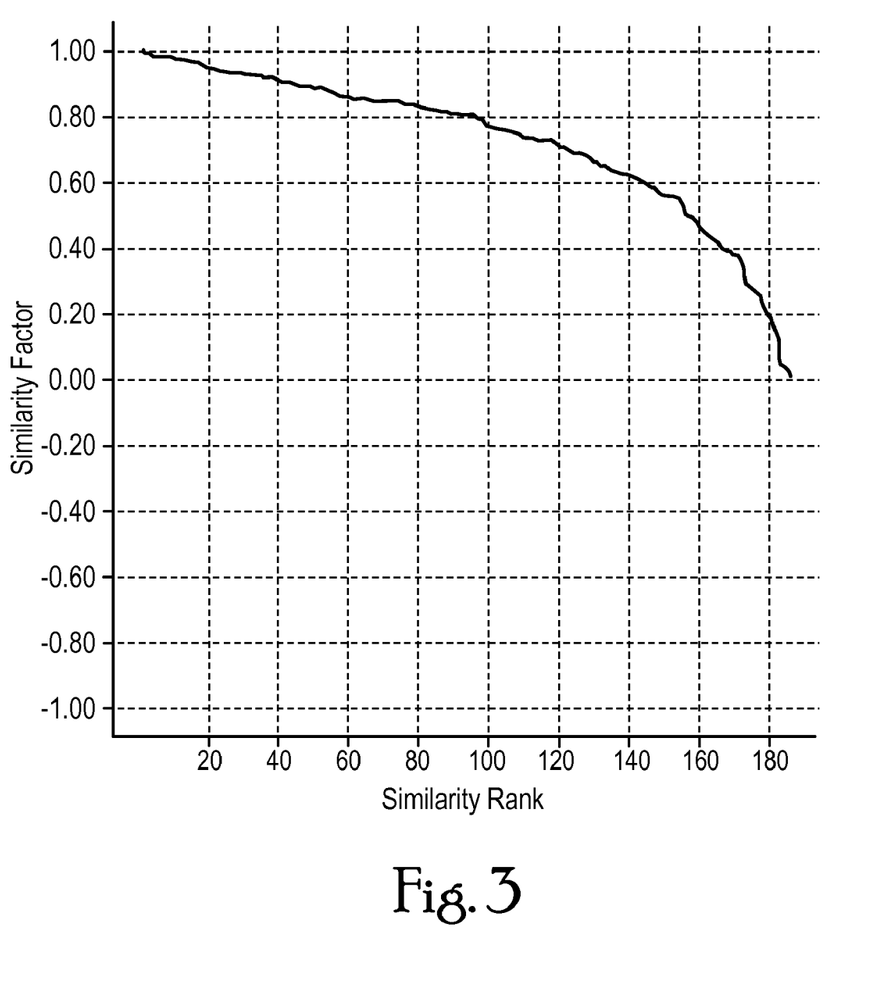
FIG. 3 is a plot of similarity factor versus similarity rank for a target reservoir against a line plot for a selection of water-flooded, sandstone reservoirs.

As will be appreciated, depending on the distribution of similarity factors, a given difference in similarity rank may represent varying degrees of difference of similarity factor. A chart, an example of which is illustrated in FIG. 3, of similarity factor against similarity rank is produced and displayed 140. The shape of the plot of factor against rank provides information to the user regarding the closeness of the match between the target reservoir and the proposed analogs making up the filtered database.

Figure 4:
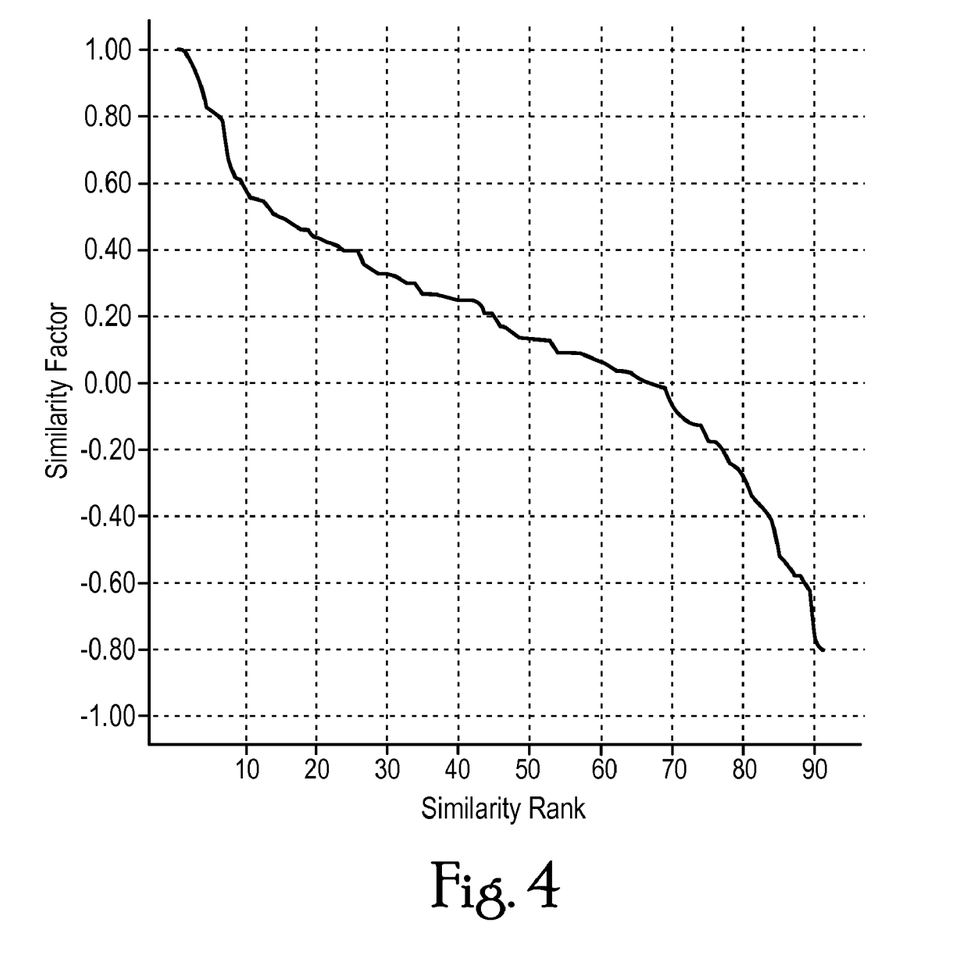
FIG. 4 is a plot of similarity factor versus similarity rank for a target reservoir against a line plot for a selection of carbonate reservoirs.

FIG. 3 and FIG. 4 represent similarity factor versus rank for a sandstone and carbonate lithology reservoir respectively, compared against each target reservoir's group of potential analogs. In the example of FIG. 3, during the filtering step 110, water-flooded sandstone reservoirs were selected. For FIG. 4, carbonate reservoirs were selected.

Comparing the example of FIG. 3 with that illustrated in FIG. 4, it may be seen that the FIG. 3 plot shows a shallow initial slope, indicating that the change in similarity factor per ranked reservoir is relatively small. This indicates a good match between the selected reservoirs in the database and the target reservoir. In contrasting fashion, the relatively steeper slope illustrated in FIG. 4 indicates that there is a large fall-off in similarity factor over a small number of ranked reservoirs. This generally indicates that the cohort chosen for the database of FIG. 4 may not be strong analogs, and a user may conclude that the target reservoir is likely to perform more similarly to some other type of reservoirs than it will to carbonate reservoirs.

Nonetheless, those reservoirs that make up the high similarity factor portion of the graph of FIG. 4 may indeed be relevant analogs to the target reservoir. On the other hand, the user should use caution in identifying as analogs outside of the most highly ranked reservoirs in the FIG. 4 example.

In an embodiment, a particular group of useful analogs may be selected automatically, based on, for example, a threshold value for slope of the similarity factor v. similarity rank line. In a particular implementation, the slope value would be evaluated starting at rank 1, to avoid selecting, for example, the relatively low slope portion in the middle of FIG. 4. While this portion of FIG. 4 exhibits little change in factor over rank, it does not appear until a great deal of similarity factor has already been dropped over the initial portion of the curve.

Figure 5:
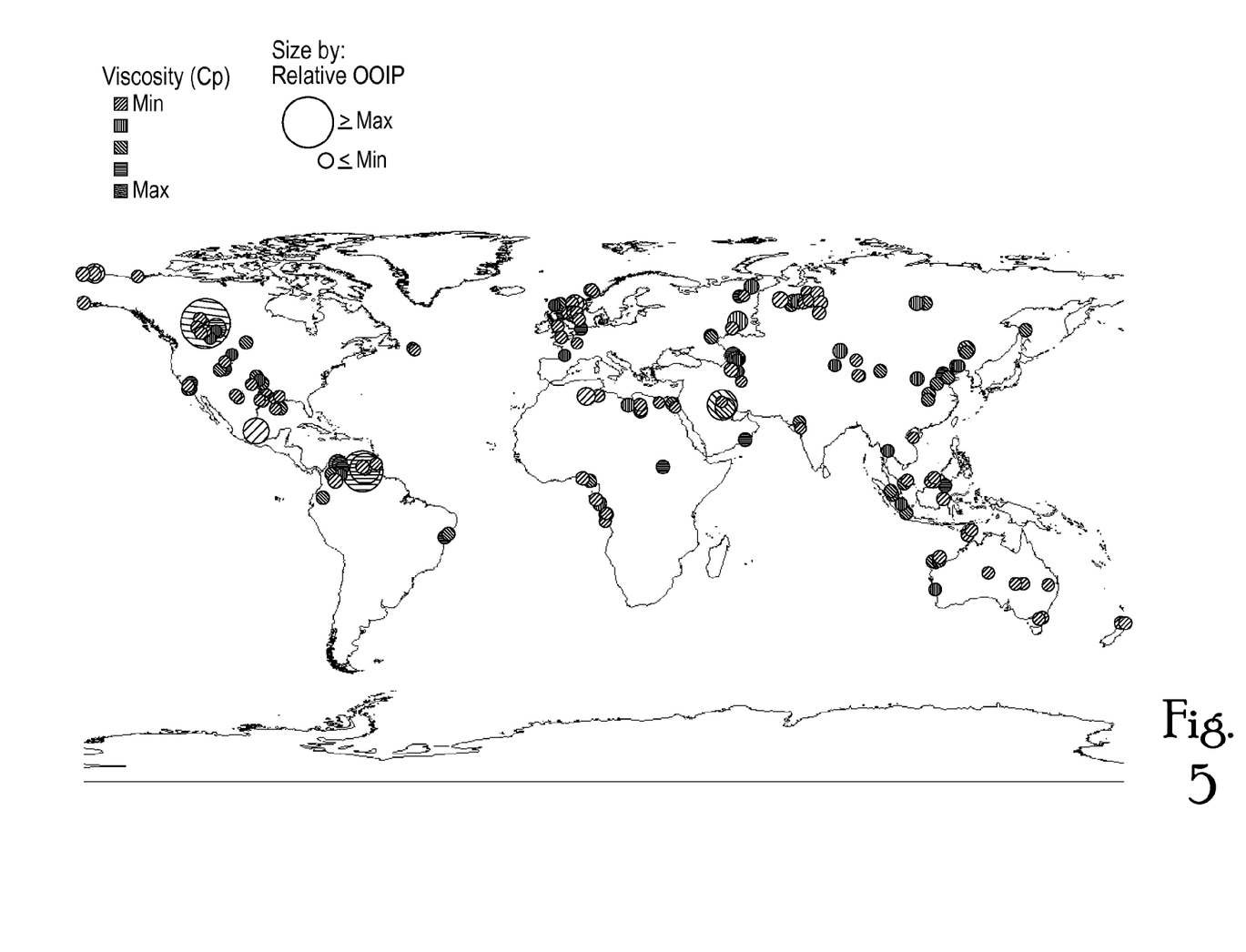
FIG. 5 is a global map illustrating information relating to identified analogs in accordance with an embodiment of the present invention.

In an embodiment, the similarity factor against similarity rank plot may be further linked to other visualizations of the data. For example, a global map may be included as illustrated in FIG. 5. The global map of FIG. 5 corresponds to the data plotted in FIG. 3. Functionality may be included that allows a user to select a portion of the factor v. rank curve to produce the global map data. That is, when a user selects an interval a, the reservoirs that make up that portion of the curve are displayed on the global map. As shown in FIG. 5, additional information may be graphically displayed for each reservoir. In the illustrated embodiment, the size of the circle is related to the original oil in place metric for that reservoir.

Figure 6:
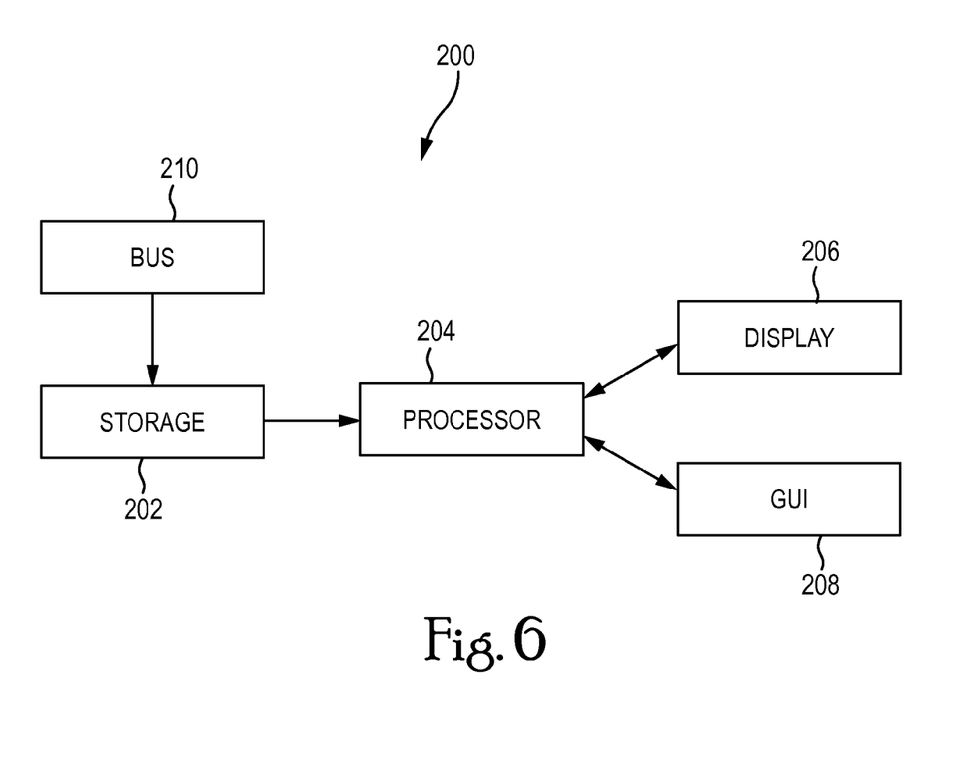
FIG. 6 is a schematic illustration of an embodiment of a system for performing methods in accordance with embodiments of the present invention.

A system for performing the method is schematically illustrated in FIG. 6. A system includes a data storage device or memory 202. The stored data may be made available to a processor 204, such as a programmable general purpose computer. The processor 204 may include interface components such as a display 206 and a graphical user interface 208. The graphical user interface may be used both to display data and processed data products and to allow the user to select among options for implementing aspects of the method. Data may be transferred to the system 200 via a bus 210 either directly from a data acquisition device, or from an intermediate storage or processing facility (not shown).

Once a cohort of good analog reservoirs have been identified, strategies for developing the target reservoir may be extrapolated from experiences with the identified analogs.

In another embodiment, the invention may be applied to characterizing analogs to a newly identified mineral deposit rather than a hydrocarbon reservoir. In this embodiment, quantitative parameters of the mineral deposit, including areal dimensions, thickness, ore grade for the mineral or element of the deposit, depth of burial, and physical properties (e.g., electrical resistivity, magnetic susceptibility, density, dielectric permittivity, natural radioactivity) of the deposit, would be included in the database, as well as qualitative measures such as deposit type and host rock classification as long as they can be expressed in quantitative terms. Similarly to the hydrocarbon embodiments, various public literature and proprietary sources may be used to populate the database of potential analogs. Data may then be filtered into appropriate analog families, as in the hydrocarbon application. In a process parallel to that employed with hydrocarbon reservoirs, a group of specific metrics is selected for use in calculating similarity factor and similarity rank for each member of the pool of analogs. Relevant analogs to the target mineral deposit can be selected based on a high similarity factor position. Other visualization tools for the selection of appropriate analogs described above for hydrocarbon reservoirs are equally applicable for mineral deposits.

Those skilled in the art will appreciate that the disclosed embodiments described herein are by way of example only, and that numerous variations will exist. The invention is limited only by the claims, which encompass the embodiments described herein as well as variants apparent to those skilled in the art.

The invention claimed is:

1. A method of evaluating similarity between a target geological region of interest and a plurality of known geological regions of interest, comprising:
   selecting a plurality of quantitative parameters describing reservoir characteristics of the target geological region of interest;
   defining a target line based on values of the selected parameters;
   constructing comparison lines for at least some of the plurality of known geological regions of interest, wherein respective comparison lines represent respective values of the quantitative parameters describing corresponding characteristics of respective regions among the known geological regions of interest;
   calculating, based on the target and comparison lines, a similarity factor for each of the comparison lines;
   ranking each of the comparison lines based on the calculated similarity factor; and determining, based on the similarity factor and ranking, a closeness of match between the target geological region of interest and the known geological regions of interest.

2. A method as in claim 1, wherein the constructing step further comprises filtering the plurality of known geological regions of interest based on user-input criteria to remove selected types of regions.

3. The method as in claim 2, wherein the user-input criteria include qualitative descriptions of the known geological regions.

4. The method as in claim 3, wherein the qualitative descriptions are selected from the group consisting of reservoir lithology, displacement drive mechanism, depositional environment, depositional energy, basin type, geography, geologic age, trap type and combinations thereof.

5. The method as in claim 1, wherein the linear graphical definition further comprises normalizing and scaling the values of the quantitative parameters.

6. The method as in claim 1, further the comprising the step of deriving a similarity factor versus similarity rank curve based on the similarity factor and ranking for each of the comparison lines.

7. The method as in claim 6, graphically displaying the similarity factor versus similarity rank curve.

8. A system for evaluating similarity between a target geological region of interest and a plurality of known geological regions of interest, comprising:
  a machine readable memory encoded with information including a selected plurality of quantitative parameters describing reservoir characteristics of the target geological region of interest;
  a processor, configured to define a graphical target line based on values of the selected parameters;
  the processor being further configured to execute machine executable instructions for graphically constructing comparison lines for at least some of the plurality of known geological regions of interest, wherein respective comparison lines represent respective values of the quantitative parameters describing corresponding characteristics of respective regions among the known geological regions of interest;
  the processor being further configured to calculate, based on the plotted target and comparison lines, a similarity factor between each of the comparison lines and the target line;
  the processor being further configured to rank the comparison lines based on the calculated similarity factors; and
  the processor being further configured to determine, based on the similarity factors and ranking, a closeness of match between the target geological region of interest and the known geological regions of interest.

9. The system as in claim 8, further wherein the processor is configured to derive a similarity factor versus similarity rank curve based on the similarity factor and ranking for each of the comparison lines.

10. The system as in claim 9, further comprising a graphical display, configured to graphically display similarity factor versus similarity curve.

* * * * *